US011056918B2

(12) United States Patent
Maniktala

(10) Patent No.: US 11,056,918 B2
(45) Date of Patent: Jul. 6, 2021

(54) SYSTEM FOR INDUCTIVE WIRELESS POWER TRANSFER FOR PORTABLE DEVICES

(71) Applicant: ChargEdge, Inc., Fremont, CA (US)

(72) Inventor: Sanjaya Maniktala, Fremont, CA (US)

(73) Assignee: CHARGEDGE, INC., Fremont, CA (US)

( * ) Notice: Subject to any disclaimer, the term of this patent is extended or adjusted under 35 U.S.C. 154(b) by 311 days.

(21) Appl. No.: 15/375,499

(22) Filed: Dec. 12, 2016

(65) Prior Publication Data

US 2017/0170688 A1 Jun. 15, 2017

Related U.S. Application Data

(60) Provisional application No. 62/266,128, filed on Dec. 11, 2015.

(51) Int. Cl.
| | |
|---|---|
| *H02J 50/12* | (2016.01) |
| *H01F 27/255* | (2006.01) |
| *H01F 38/14* | (2006.01) |
| *H02J 7/02* | (2016.01) |
| *H01F 27/26* | (2006.01) |

(52) U.S. Cl.
CPC ............ *H02J 50/12* (2016.02); *H01F 27/255* (2013.01); *H01F 38/14* (2013.01); *H02J 7/025* (2013.01); *H01F 27/26* (2013.01)

(58) Field of Classification Search
CPC ..................................................... H02J 50/12
USPC ........................................................ 320/108
See application file for complete search history.

(56) References Cited

U.S. PATENT DOCUMENTS

| 6,212,430 | B1 | 4/2001 | Kung |
|---|---|---|---|
| 9,276,437 | B2 | 3/2016 | Partovi et al. |
| 2006/0061324 | A1 | 3/2006 | Oglesbee |
| 2009/0096413 | A1 | 4/2009 | Partovi et al. |

(Continued)

FOREIGN PATENT DOCUMENTS

WO WO2013122483 A1 8/2013

OTHER PUBLICATIONS

"Notification of Transmittal of the International Search Report and the Written Opinion of the International Searching Authority," Int'l Appl. No. PCT/US2017/020465, dated May 11, 2017.

(Continued)

*Primary Examiner* — Robert Grant
(74) *Attorney, Agent, or Firm* — White & Case LLP

(57) ABSTRACT

In one embodiment a wireless power transfer system comprises a transmitter including a power source configured to generate a time-varying current, a first coil configured to receive the first time-varying current from the power source, wherein the time-varying current flows in the first coil in a first direction, a second coil coupled to the first coil in such a way that the time-varying current flows in the second coil in a second direction, wherein the first direction is opposite from the second direction, and an underlying magnetic layer configured to magnetically couple the first coil with the second coil, and a wireless power receiver, a ferrite core and a receiver coil that share a longitudinal axis, and a receive circuit coupled to the receiver coil configured to convert a time varying current induced in the receiver coil into a voltage.

26 Claims, 5 Drawing Sheets

(56) References Cited

U.S. PATENT DOCUMENTS

| | | | |
|---|---|---|---|
| 2009/0243397 A1* | 10/2009 | Cook | H02J 5/005 |
| | | | 307/104 |
| 2010/0181841 A1 | 7/2010 | Azancot et al. | |
| 2010/0259217 A1 | 10/2010 | Baarman et al. | |
| 2011/0115429 A1 | 5/2011 | Toivola et al. | |
| 2011/0217927 A1 | 9/2011 | Ben-Shalom et al. | |
| 2011/0304216 A1 | 12/2011 | Baamian | |
| 2012/0154086 A1* | 6/2012 | Willemsen | H01F 7/0252 |
| | | | 335/299 |
| 2012/0155064 A1* | 6/2012 | Waters | A42B 1/242 |
| | | | 362/103 |
| 2013/0043734 A1 | 2/2013 | Stone et al. | |
| 2013/0093252 A1 | 4/2013 | Norconk et al. | |
| 2013/0175877 A1* | 7/2013 | Abe | H04B 5/0037 |
| | | | 307/104 |
| 2013/0249479 A1 | 9/2013 | Partovi | |
| 2013/0307468 A1 | 11/2013 | Lee et al. | |
| 2014/0070622 A1 | 3/2014 | Keeling et al. | |
| 2014/0167688 A1 | 6/2014 | Doyle et al. | |
| 2014/0232330 A1* | 8/2014 | Robertson | H01M 2/1022 |
| | | | 320/108 |
| 2014/0266031 A1 | 9/2014 | Sasaki | |
| 2015/0091388 A1 | 4/2015 | Golko et al. | |
| 2015/0102684 A1* | 4/2015 | Tanaka | B60K 1/04 |
| | | | 307/104 |
| 2015/0194839 A1* | 7/2015 | Wojcik | H01M 10/425 |
| | | | 320/108 |
| 2015/0295416 A1 | 10/2015 | Li | |
| 2015/0372493 A1 | 12/2015 | Sankar | |

OTHER PUBLICATIONS

Wireless Power Consortium, "Qi System Description Wireless Power Transfer," vol. I: Low Power, Part 1: Interface Definition, Version 1.1.2, Jun. 2013.
Maniktala, S., "Fixing EMI across the Board," EE Times, Nov. 5, 2003, http://www.eetimes.com/document.asp?doc_id=1230444.
Maniktala, S., "More on Designing Reliable Electronic Ballasts," EE Times, Apr. 20, 2005, http://www.eetimes.com/document.asp?doc_id=1272231.
Maniktala, S. "The Confluence of Resonant Switching Topologies and Wireless Charging," presented at ISSCC 2015, San Francisco, CA, Feb. 26, 2015.
Maniktala, S., "WPT Breaks All Connections, Part 1," EDN Network, Mar. 9, 2015, http://www.edn.com/design/power-management/4438850/WPT-breaks-all-connections—Part-1.
Maniktala, S., "WPT Breaks All Connections, Part 2," EDN Network, Mar. 14, 2015, http://www.edn.com/design/power-management/4438924/WPT-breaks-all-connections--Part-2.
Maniktala, S., "WPT Breaks All Connections, Part 3," EDN Network, Apr. 6, 2015, http://www.edn.com/design/power-management/4439125/WPT-breaks-all-connections—Part-3.
Power Matters Alliance, "PMA Inductive Wireless Power and Charging Transmitter Specification—System Release 1," PMA-TS-0003-0 v2.00, Apr. 24, 2014.
Power Matters Alliance, "PMA Inductive Wireless Power and Charging Receiver Specification—System Release 1," PMA-TS-0001-0 v1.00, Nov. 16, 2013.
"Notification of Transmittal of the International Search Report and the Written Opinion of the International Searching Authority," Int'l Appl. No. PCT/US2016/066105, dated Feb. 7, 2017.

* cited by examiner

SYSTEM FOR INDUCTIVE WIRELESS POWER TRANSFER FOR PORTABLE DEVICES

CROSS-REFERENCE TO RELATED APPLICATIONS

This application claims the benefit of U.S. Provisional Patent Application No. 62/266,128, entitled "Wireless Power Transfer for Wearables," filed on Dec. 11, 2015. This application is also related to U.S. patent application Ser. No. 15/082,533, entitled "Wireless Power Transfer Using Multiple Coil Arrays," filed on Mar. 28, 2016. The subject matters of the related applications are hereby incorporated by reference in their entirety.

FIELD OF THE INVENTION

This invention relates generally to inductive wireless power transfer and more specifically to a system for wireless power transfer for portable devices.

BACKGROUND

Electronic devices typically require a connected (wired) power source to operate, for example, battery power or a wired connection to a direct current ("DC") or alternating current ("AC") power source. Similarly, rechargeable battery-powered electronic devices are typically charged using a wired power-supply that connects the electronic device to a DC or AC power source. The limitation of these devices is the need to directly connect the device to a power source using wires.

Wireless power transfer (WPT) involves the use of time-varying magnetic fields to wirelessly transfer power from a source to a device. Faraday's law of magnetic induction provides that if a time-varying current is applied to one coil (e.g., a transmitter coil) a voltage will be induced in a nearby second coil (e.g., a receiver coil). The voltage induced in the receiver coil can then be rectified and filtered to generate a stable DC voltage for powering an electronic device or charging a battery. The receiver coil and associated circuitry for generating a DC voltage can be connected to or included within the electronic device itself such as a smartphone.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Some techniques for WPT use two or more transmitter coils in an attempt to overcome the issue of low power transfer over short distances. Typically, two identical transmitter coils (e.g., both wound in the clockwise direction or both wound in the counter-clockwise direction and having the same number of turns and area) are coupled in series or parallel on a single magnetic layer to transfer power to a receiver coil. Alternatively, the coils can be placed in close proximity to one another without the use of a magnetic layer. This configuration results in the applied time-varying current flowing through both coils in the same direction at any point in time, generating an almost perpendicular combined magnetic field with flux lines that flow from both coils in the same direction (i.e., the magnetic field generated by either coil has the same polarity as the other coil). Magnetic flux lines tend to repel if they are in the same direction, which causes the flux lines to radiate through the air for great distances. When magnetic flux lines repel, the magnetic reluctance is high, resulting in a weak magnetic field that reduces the amount of magnetic coupling between the transmitter coils and a receiver coil placed in close proximity (i.e., 2-5 millimeters) to the transmitter coils. So although the coil area is larger than in a single-coil transmitter, the resulting magnetic flux available to transfer power is reduced. If the transmitter coils are placed on separate magnetic layers, an air gap exists between the magnetic layers resulting in an even weaker generated magnetic field as the air gap further increases the reluctance between the transmitter coils.

Due to the short range of existing WPT technology, the transmitter coil must be centered with the receiver coil connected to a device and the coils cannot be more than 2-5 millimeters apart. This makes it difficult to implement wireless power transfer for devices that are not perfectly flat or do not have a large enough area for embedding a typical receiver coil (e.g., Android® wearable devices, Apple® watch, Fitbit® fitness tracker, etc.). The limitations of WPT also affect smartphones if the charging surface with the transmitter coil is not large enough to allow the smartphone device to sit flat on the surface (e.g., in vehicles, which typically do not have a large enough flat surface to accommodate a smartphone device). Thus, the current state of WPT technology is not suitable for many consumer or small industrial devices.

SUMMARY OF THE INVENTION

In one embodiment a wireless power transfer system comprises a transmitter including a power source configured to generate a time-varying current, a first coil configured to receive the first time-varying current from the power source, wherein the time-varying current flows in the first coil in a first direction, a second coil coupled to the first coil in such a way that the time-varying current flows in the second coil in a second direction, wherein the first direction is opposite from the second direction, and an underlying magnetic layer configured to magnetically couple the first coil with the second coil, and a wireless power receiver including a ferrite core and a receiver coil that share a longitudinal axis, and a receive circuit coupled to the receiver coil configured to convert a time varying current induced in the receiver coil into a voltage. In one embodiment the wireless power receiver further includes a rechargeable battery.

In one embodiment an electronic device comprises a wireless power receiver structure including a ferrite core, a receiver coil coupled to the ferrite core such that the ferrite core and the receiver coil share a longitudinal axis, a receive circuit coupled to the receiver coil configured to convert a time varying current induced in the receiver coil into a voltage, and a visible marking that indicates the longitudinal axis of the ferrite core and the receiver coil.

DETAILED DESCRIPTION

Figure 1:
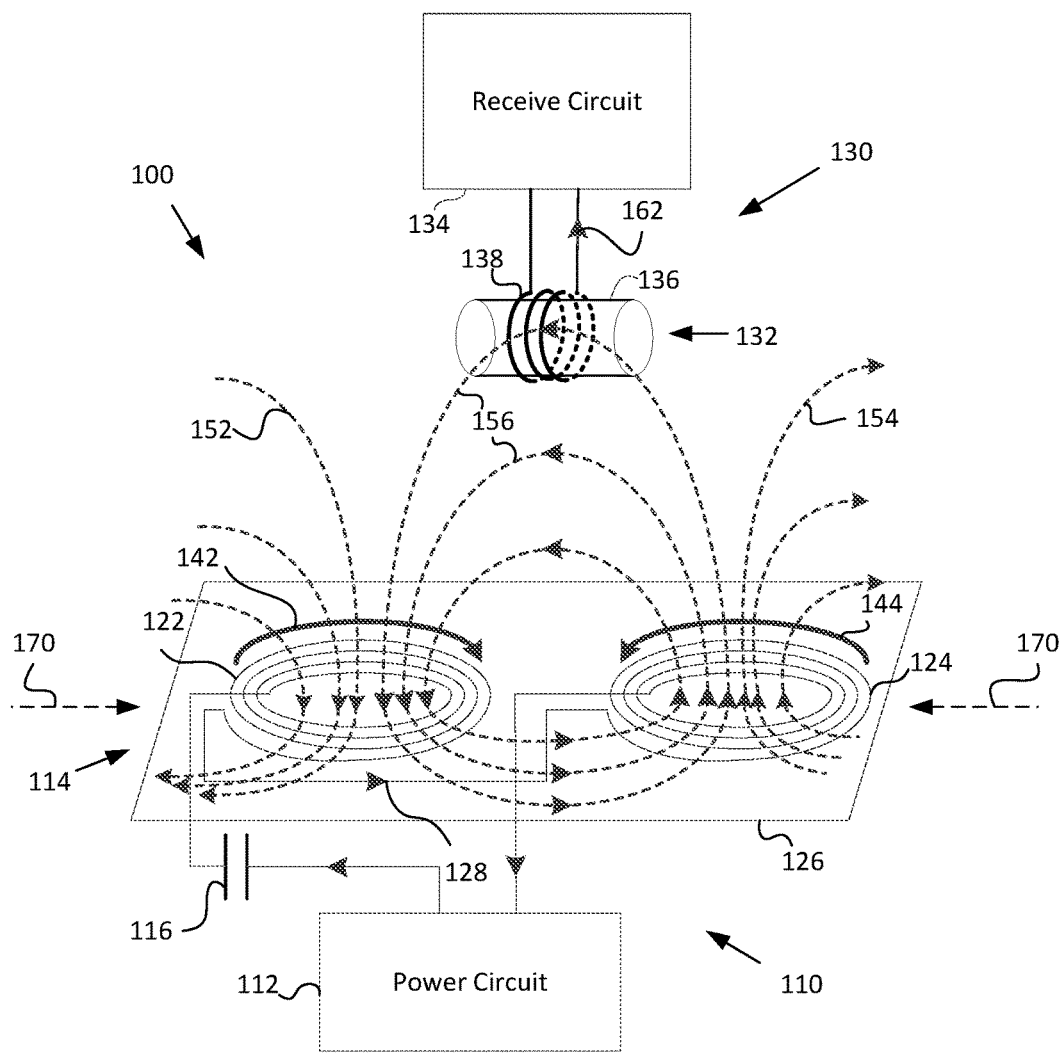
FIG. 1 is a diagram illustrating one embodiment of a wireless power transfer system according to the present invention.

FIG. 1 is a diagram illustrating one embodiment of a wireless power transfer system 100 including a transmitter 110 and a receiver 130. Transmitter 110 includes, but is not limited to, a power circuit 112, a coil structure 114, and a capacitor 116. Coil structure 114 includes, but is not limited to, a coil 122 and a coil 124 that are magnetically coupled together by a magnetic layer 126. Magnetic layer 126 underlies both coil 122 and coil 124. Magnetic layer 126 can be ferrite or any other magnetic layer known in the art. Coil 122 and coil 124 are preferably identical coils with the same number of turns and the same area. Power circuit 112 generates an AC signal having a voltage magnitude consistent with an input DC voltage applied to power circuit 112. The generated AC signal can be, but is not limited to, a square wave, a sinusoidal wave, a triangular wave, or a sawtooth wave. The resonant frequency of transmitter 110 is determined by the capacitance of capacitor 116 and the total inductance of coil 122 and coil 124. The AC signal causes current to flow from power circuit 112 to coil 122 via capacitor 116 and the flow of current through coil 122 generates a magnetic field. The current flows from coil 122 to coil 124. When coils 122 and 124 are identical, the flow of current through coil 124 generates a magnetic field equivalent in magnitude to the magnetic field generated by coil 122. Coils 122 and 124 can be formed of wire or traces on a printed circuit board using conductive material such as copper, gold, or any other conductive material known in the art.

A current 142 flows through coil 122 in the clockwise direction. The clockwise flow of current 142 through coil 122 generates a magnetic field represented by flux lines 152. According to the "right-hand-rule," the clockwise flow of current 142 through coil 122 causes flux lines 152 to flow in the downward direction. Current 142 flows from coil 122 to coil 124 through a connection 128 (i.e., coil 122 is coupled in series with coil 124). A current 144 flows through coil 124 in the counter-clockwise direction. The counter-clockwise flow of current 144 through coil 124 generates a magnetic field represented by flux lines 154. According to the "right-hand-rule," the counter-clockwise flow of current 144 through coil 124 causes flux lines 154 to flow in the upward direction.

Current 142 is equivalent in magnitude to current 144 but flows in an opposite direction. If coil 142 and coil 144 are identical, the flow of current 142 through coil 122 generates a magnetic field equivalent in magnitude to the magnetic field generated by the flow of current 144 through coil 124. Because current 142 and current 144 are flowing in opposite directions at any given point in time, the magnetic field generated by current 142 is in a different direction than the magnetic field generated by current 144 (i.e., the magnetic fields have different polarity). Further, because flux lines 152 and flux lines 154 are flowing in opposite directions, the magnetic reluctance between flux lines 152 and flux lines 154 is low, causing flux lines 152 and flux lines 154 to attract to each other. Flux lines 152 and flux lines 154 magnetically couple to form closed flux lines 156. In another embodiment, coil 122 is coupled in parallel with coil 124 such that a current flowing in coil 122 is flowing in an opposite direction to a current flowing in coil 124 to form closed flux lines between coils 122 and 124.

Receiver 130 includes, but is not limited to, a receiver coil structure 132 and a receive circuit 134. Receiver coil structure 132 includes a ferrite core 136 and a helical coil 138. In the FIG. 1 embodiment, ferrite core 136 is in the shape of a cylindrical rod and helical coil 138 is wrapped around ferrite core 136 such that ferrite core 136 and helical coil 138 have a common longitudinal axis. In other embodiments, ferrite core 136 may be a parallelepiped or other shape, or may be made of a flexible ferrite sheet. Helical coil 138 is preferably formed of wire made from a conductive material such as copper, gold, or any other conductive material known in the art. Receiver coil structure 132 is oriented in relation to transmitter coil structure 114 such that flux lines 156 of the magnetic field produced by transmitter 110 pass through ferrite core 136. Receiver coil structure 132 is optimally oriented such that the longitudinal axis of ferrite core 136 is substantially parallel to a longitudinal axis 170 of transmitter coil structure 114. In one embodiment, an outer surface of transmitter coil structure 114 includes a visible marking that indicates longitudinal axis 170. Faraday's law provides that the time-varying current that flows in a receiver coil will oppose the magnetic field generated by a transmitter coil. Thus flux lines 156 passing through ferrite core 136 cause a time-varying current 162 to flow in helical coil 138. Receiver coil structure 132 is coupled to receive circuit 134 such that current 162 is input to receive circuit 134. Receive circuit 134 includes, but is not limited to, a rectifier to generate a DC voltage, a filter to reduce noise, and a voltage regulator to define a voltage magnitude and maintain the voltage under load. The voltage generated by receive circuit 134 as a result of the coupling of flux lines 156 to coil structure 132 can be used to charge a battery or power a device (e.g., a smart phone, laptop or any other electronic device).

Figure 2:
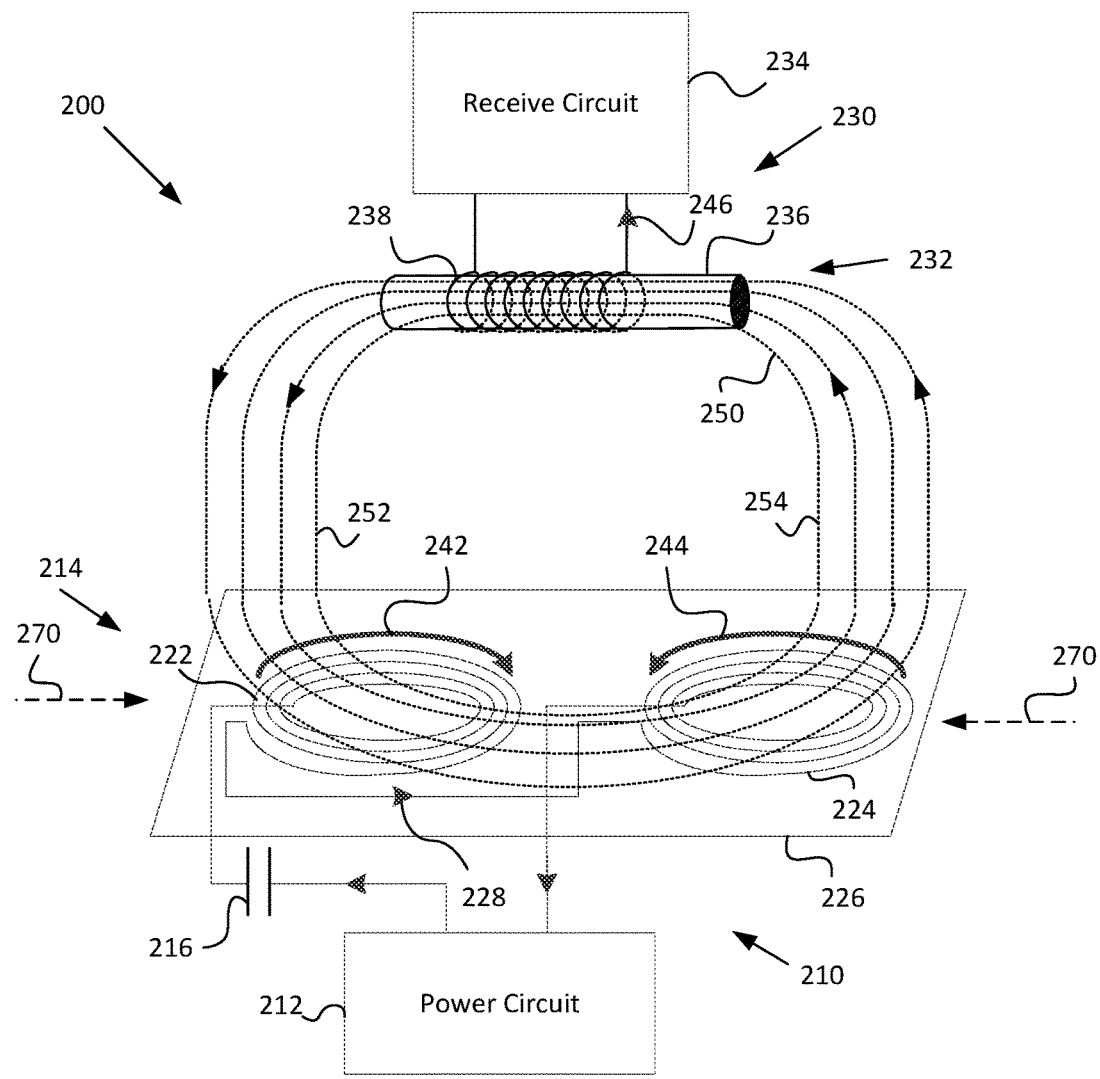
FIG. 2 is a diagram illustrating one embodiment of a wireless power transfer system according to the present invention.

FIG. 2 is a diagram illustrating one embodiment of a wireless power transfer system 200 including a transmitter 210 and a receiver 230. Transmitter 210 includes, but is not limited to, a power circuit 212, a transmitter coil structure 214, and a capacitor 216. Coil structure 214 includes, but is not limited to, a coil 222 and a coil 224 that are magnetically coupled together by a magnetic layer 226. Magnetic layer 226 underlies both coil 222 and coil 224. Magnetic layer 226 can be ferrite or any other magnetic layer known in the art. Coil 222 and coil 224 are preferably identical coils with the same number of turns and the same area. Coil 222 and coil 224 are both wound in the clockwise direction but both coils could alternatively be wound in the counter-clockwise direction. A power circuit 212 generates an AC signal having a voltage magnitude consistent with an input DC voltage applied to power circuit 112. The AC signal can be, but is not limited to, a square wave, a sinusoidal wave, a triangular wave, or a sawtooth wave. The resonant frequency of transmitter 110 is determined by the capacitance of capacitor 116 and the total inductance of coil 122 and coil 124. The AC signal causes current to flow from power circuit 212 to coil 222 via capacitor 216 and the flow of current through coil 222 generates a magnetic field. The current flows from coil 222 to coil 224. When coils 222 and 224 are identical, the flow of current through coil 224 generates a magnetic field equivalent in magnitude to the magnetic field generated by coil 222. Coils 222 and 224 can be formed of wire or traces on a printed circuit board using conductive material such as copper, gold, or any other conductive material known in the art.

A current 242 flows through coil 222 in the clockwise direction. The clockwise flow of current 242 through coil 222 generates a magnetic field represented by flux lines 252. According to the "right-hand-rule," the clockwise flow of current 242 through coil 222 causes flux lines 252 to flow in the downward direction. Current 242 flows from coil 222 to coil 224 through a connection 228 (i.e., coil 222 is coupled in series with coil 224). A current 244 flows through coil 224 in the counter-clockwise direction. The counter-clockwise flow of current 244 through coil 224 generates a magnetic field represented by flux lines 254. According to the "right-hand-rule," the counter-clockwise flow of current 244 through coil 224 causes flux lines 254 to flow in the upward direction.

Current 242 is equivalent in magnitude to current 244 but flows in an opposite direction. If coil 242 and coil 244 are identical, the flow of current 242 through coil 222 generates a magnetic field equivalent in magnitude to the magnetic field generated by the flow of current 244 through coil 224. Because current 242 and current 244 are flowing in opposite directions at any given point in time, the magnetic field generated by current 242 is in a different direction than the magnetic field generated by current 244 (i.e., the magnetic fields have different polarity). Further, because flux lines 252 and flux lines 254 are flowing in opposite directions, the magnetic reluctance between flux lines 252 and flux lines 254 is low, causing flux lines 252 and flux lines 254 to attract to each other. Flux lines 252 and flux lines 254 magnetically couple to form closed flux lines 250. In another embodiment, coil 222 is coupled in parallel with coil 224 such that a current flowing in coil 222 is flowing in an opposite direction to a current flowing in coil 224 to form closed flux lines between coils 222 and 224.

Receiver 230 includes, but is not limited to, a receive circuit 234 and a receiver coil structure 232. Receiver coil structure 232 includes a ferrite core 236 and a helical coil 238. In the FIG. 2 embodiment, ferrite core 236 is in the shape of a cylindrical rod and helical coil 238 wraps around ferrite core 236 such that ferrite core 236 and helical coil 238 share a longitudinal axis. In other embodiments, ferrite core 236 may be a parallelepiped or other shape. Helical coil 238 is preferably formed of wire made from a conductive material such as copper, gold, or any other conductive material known in the art. Receiver coil structure 232 is oriented in relation to transmitter coil structure 214 such that flux lines 250 of the magnetic field produced by transmitter 210 pass through ferrite core 236 substantially parallel to the longitudinal axis of ferrite core 236 and helical coil 238. Ferrite core 236 attracts and focuses flux lines 250 such that a substantial amount of the magnetic flux produced by transmitter 210 flows through receiver coil structure 232. Receiver coil structure 232 is optimally oriented such that the longitudinal axis of ferrite core 236 is substantially parallel to a longitudinal axis 270 of transmitter coil structure 214. In one embodiment, an outer surface of transmitter coil structure 214 includes a visible marking that indicates longitudinal axis 270. Faraday's law provides that the time-varying current that flows in a receiver coil will oppose the magnetic field generated by a transmitter coil. Thus flux lines 250 passing through receiver coil structure 232 cause a time-varying current 246 to flow in helical coil 238. Receiver coil structure 232 is coupled to receive circuit 234 such that current 242 is input to receive circuit 234. Receive circuit 234 includes, but is not limited to, a rectifier to generate a DC voltage, a filter to reduce noise, and a voltage regulator to define a voltage magnitude and maintain the voltage under load. The voltage generated by receive circuit 234 as a result of the concentration of flux lines 250 through receiver coil structure 232 can be used to charge a battery or power a device. The presence of ferrite core 236 enhances the wireless transfer of power from transmitter 210 to receive circuit 234 by focusing a substantial amount of the magnetic flux generated by transmitter 210 through helical coil 238.

Figure 3A:
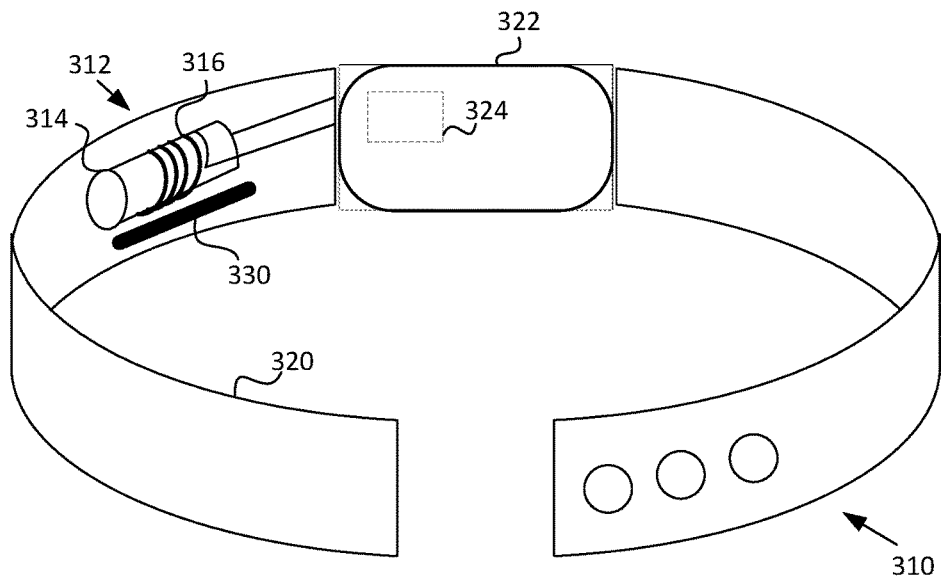
FIG. 3A is a diagram illustrating one embodiment of a wearable device with a wireless power receiver coil structure according to the present invention.

FIG. 3A is a diagram illustrating one embodiment of a wearable device 310 with a wireless power receiver coil structure 312. Wearable device 310 includes a strap 320, an electronic device 322, and receiver coil structure 312. Electronic device 322 may be, for example, a fitness tracker, a pedometer, a heartrate monitor, a watch, a mobile telephone, or a computer and includes a rechargeable battery (not shown). Electronic device 322 also includes a receive circuit 324 coupled to receiver coil structure 312 to rectify and filter received energy into a voltage and charge the battery. Electronic device 322 has a housing that may be formed of plastic, metal, or a combination of materials. Receiver coil structure 312 includes a ferrite core 314 and a helical coil 316. In the FIG. 3A embodiment, ferrite core 314 is in the shape of a cylindrical rod and helical coil 316 winds around ferrite core 314 such that ferrite core 314 and helical coil 316 share a longitudinal axis. Receiver coil structure 312 can be attached to an outer surface of strap 320 or embedded within strap 320. Wearable device 310 can be placed on a surface of a transmitter such as transmitter 110 or 210 such that receiver coil structure 312 receives magnetic flux and generates a time varying current that is provided to receive circuit 324. Wearable device 310 includes a visible marking 330 on the surface of strap 320 that indicates the longitudinal axis of receiver coil structure 312. During power transfer, wearable device 310 is preferably oriented with respect to the transmitter such that the longitudinal axis of receiver coil structure 312 is substantially parallel to a longitudinal axis of the transmitter coil structure. In another embodiment, receiver coil structure 312 and receive circuit 324 are embodied in a receiver module that can be external to electronic device 322 or incorporated into electronic device 322.

Figure 3B:
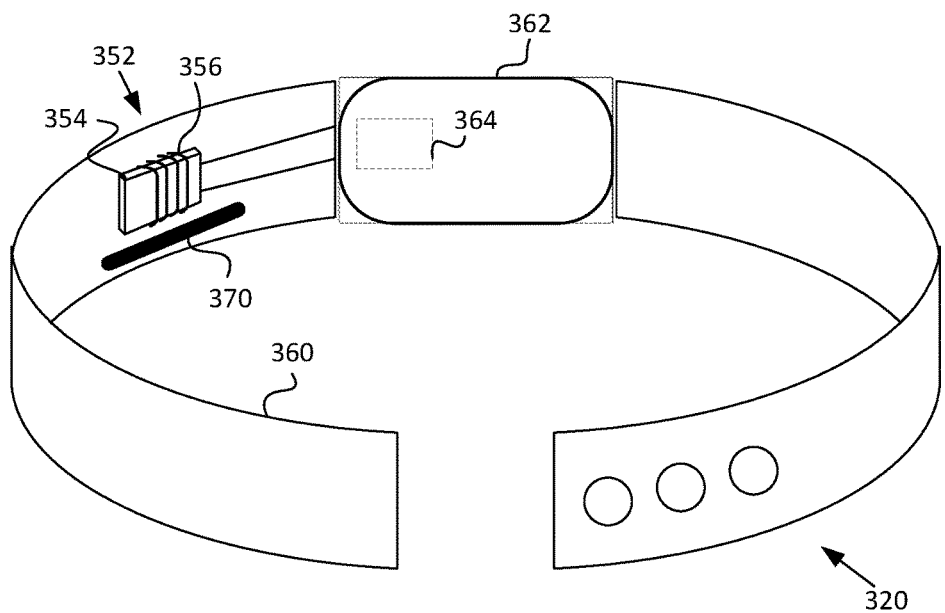
FIG. 3B is a diagram illustrating one embodiment of a wearable device with a wireless power receiver coil structure according to the present invention.

FIG. 3B is a diagram illustrating one embodiment of a wearable device 350 with a wireless power receiver coil structure 352. Wearable device 350 includes a strap 360, an electronic device 362, and receiver coil structure 352. Electronic device 362 may be, for example, a fitness tracker, a pedometer, a heartrate monitor, a watch, a mobile telephone, or a computer and includes a rechargeable battery (not shown). Electronic device 362 also includes a receive circuit 364 coupled to receiver coil structure 352 to rectify and filter received energy into a voltage and charge the battery. Electronic device 362 has a housing that may be formed of plastic, metal, or a combination of materials. Receiver coil structure 352 includes a ferrite core 354 and a coil 356. In the FIG. 3B embodiment, ferrite core 354 is in the shape of a parallelepiped and coil 356 winds around ferrite core 354 such that ferrite core 354 and coil 356 share a longitudinal axis. Ferrite core 354 is formed of a flexible ferrite material that can flex in concert with strap 360. Receiver coil structure 352 can be attached to an outer surface of strap 360 or embedded within strap 360. Wearable device 350 can be placed on a surface of a transmitter such as transmitter 110 or 210 such that receiver coil structure 352 receives magnetic flux and generates a time varying current that is provided to receive circuit 364. Wearable device 350 includes a visible marking 370 on the surface of strap 360 that indicates the longitudinal axis of receiver coil structure 352. During power transfer, wearable device 350 is preferably oriented with respect to the transmitter such that the longitudinal axis of receiver coil structure 352 is substantially parallel to a longitudinal axis of the transmitter's coil structure. In another embodiment, receiver coil structure 352 and receive circuit 364 are embodied in a receiver module that can be external to electronic device 362 or incorporated into electronic device 362.

Figure 4:
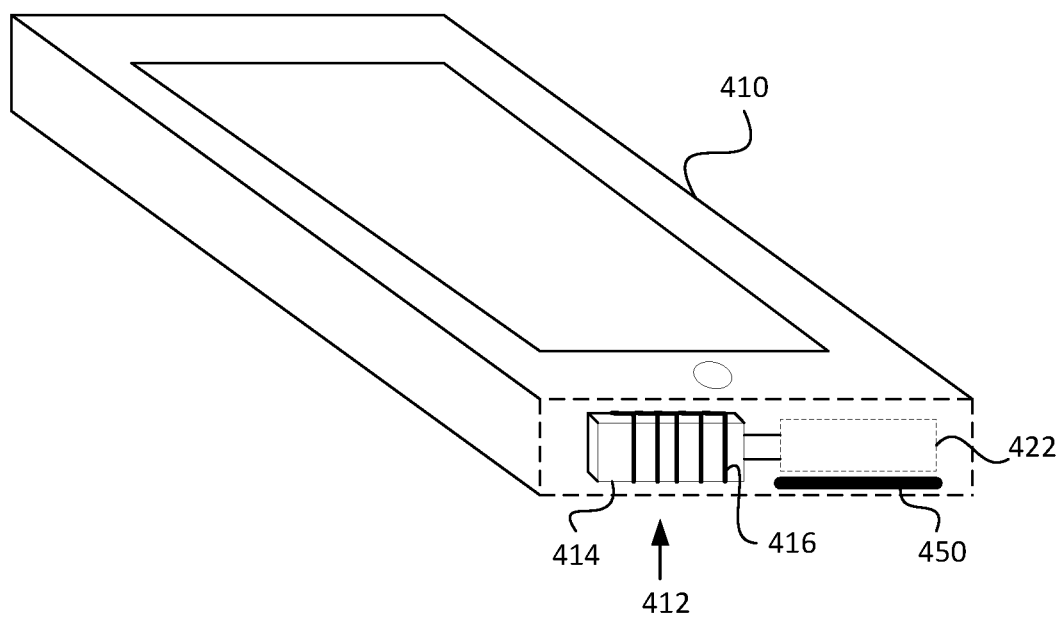
FIG. 4 is a diagram illustrating one embodiment of a mobile device with a wireless power receiver coil structure according to the present invention.

FIG. 4 is a diagram illustrating one embodiment of a mobile device 410 with a wireless power receiver coil structure 412. Mobile device 410 may be any type of electronic device powered by a battery (not shown), for example a smartphone, a tablet, a camera, or a toy. Mobile device 410 includes, but is not limited to, a receiver coil structure 412 and a receive circuit 422 coupled to receiver coil structure 412 to rectify and filter received energy into a voltage and charge the battery. Mobile device 410 has a housing that may be formed of plastic, metal, or a combination of materials. Receiver coil structure 412 is preferably located within the housing of mobile device 412. Receiver coil structure 412 includes a ferrite core 414 and a coil 416. In the FIG. 4 embodiment, ferrite core 414 is in the shape of a parallelepiped and coil 416 winds around ferrite core 414 such that ferrite core 414 and coil 416 share a longitudinal axis. Coil 416 is preferably formed of wire made from a conductive material such as copper, gold, or any other conductive material known in the art. Mobile device 410 can be placed on a surface of a transmitter such as transmitter 110 or 210 such that receiver coil structure 412 receives magnetic flux and generates a time varying current that is provided to receive circuit 422. Mobile device 410 may include a visible marking 450 that indicates the longitudinal axis of receiver coil structure 412. During power transfer, mobile device 410 is preferably oriented with respect to the transmitter such that the longitudinal axis of receiver coil structure 412 is substantially parallel to a longitudinal axis of the transmitter's coil structure.

Figure 5:
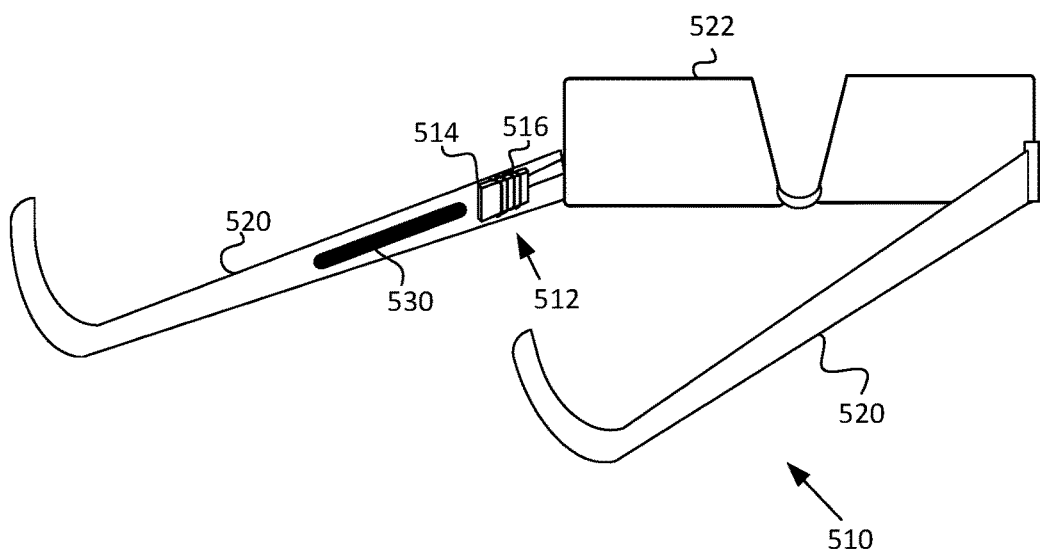
FIG. 5 is a diagram illustrating one embodiment of a wearable device with a wireless power receiver coil structure according to the present invention.

FIG. 5 is a diagram illustrating one embodiment of a wearable device 510 with a wireless power receiver coil structure 512. Wearable device 510 includes an eyepiece 522, temple pieces 520, and receiver coil structure 512. Wearable device 510 may be, for example, 3-D glasses, a virtual reality (VR) headset, sunglasses with built-in Bluetooth speakers, or other type of electronic device intended to be worn on the head, and includes a rechargeable battery (not shown). Wearable device 510 also includes a receive circuit (not shown) coupled to receiver coil structure 512 to rectify and filter received energy into a voltage and charge the battery. Receiver coil structure 512 includes a ferrite core 514 and a coil 516. In the FIG. 5 embodiment, ferrite core 514 is in the shape of a parallelepiped and coil 516 winds around ferrite core 514 such that ferrite core 514 and coil 516 share a longitudinal axis. Ferrite core 514 is formed of a flexible ferrite material that can flex in concert with temple piece 520. Coil 516 is preferably formed of wire made from a conductive material such as copper, gold, or any other conductive material known in the art. Receiver coil structure 512 can be attached to an outer surface of temple piece 520 or embedded within temple piece 520. Wearable device 510 can be placed on a surface of a transmitter such as transmitter 110 or 210 such that receiver coil structure 512 receives magnetic flux and generates a time varying current that is provided to receive circuit. Wearable device 510 may include a visible marking 550 on temple piece 520 that indicates the longitudinal axis of receiver coil structure 512. During power transfer, wearable device 510 is preferably oriented with respect to the transmitter such that the longitudinal axis of receiver coil structure 512 is substantially parallel to a longitudinal axis of the transmitter's coil structure. In another embodiment, receiver coil structure 512 is incorporated into eyepiece 522.

Receiver coil structures 312, 352, 412, and 512 may also be used to provide power to other types of devices with or without a rechargeable battery including, but not limited to, medical implants, medical point-of-care equipment, vacuum cleaners, tablets, laptops, smartphones, two-way radios, toys, virtual reality glasses, cameras, portable tools, lighting, remote controls, emergency lamps, gaming stations, electric vehicle charging, in-cabin car charging, robots, unmanned aerial vehicles (drones).

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A wireless power transfer system comprising:
    a wireless power receiver comprising
        a ferrite core, wherein a cross section of the ferrite core is solid,
        a receiver coil having a length wrapped around the ferrite core such that the ferrite core and the receiver coil share a longitudinal axis, wherein the receiver coil is disposed at a substantially same angle to the longitudinal axis along the length of the receiver coil, and
        a receive circuit coupled to the receiver coil configured to convert a time varying current induced in the receiver coil into a voltage,
        wherein the wireless power receiver includes an externally visible marking that indicates the longitudinal axis of the ferrite core and the receiver coil; and
    a housing in which the wireless power receiver is disposed, an external portion of the housing configured for a predetermined alignment between the receiver coil and the housing.

2. The wireless power transfer system of claim 1, wherein the ferrite core is a cylindrical rod and the receiver coil is a helical coil.

3. The wireless power transfer system of claim 1, wherein the ferrite core is a parallelepiped and the receiver coil wraps around the ferrite core.

4. The wireless power transfer system of claim 1, wherein the ferrite core is made of a flexible ferrite material.

5. The wireless power transfer system of claim 1, wherein the wireless power receiver is coupled to a wearable electronic device.

6. A wireless power transfer system comprising:
a wireless power receiver comprising
a rechargeable battery,
a ferrite core, wherein a cross section of the ferrite core is solid,
a receiver coil having a length wrapped around the ferrite core such that the ferrite core and the receiver coil share a longitudinal axis, wherein the receiver coil is disposed at a substantially same angle to the longitudinal axis along the length of the receiver coil, and
a receive circuit coupled to the receiver coil configured to convert a time varying current induced in the receiver coil into a voltage to charge the rechargeable battery,
wherein the wireless power receiver includes an externally visible marking that indicates the longitudinal axis of the ferrite core and the receiver coil; and
a housing in which the wireless power receiver is disposed, an external portion of the housing configured for a predetermined alignment between the receiver coil and the housing.

7. The wireless power transfer system of claim 6, wherein the ferrite core is a cylindrical rod and the receiver coil is a helical coil.

8. The wireless power transfer system of claim 6, wherein the ferrite core is a parallelepiped and the receiver coil wraps around the ferrite core.

9. The wireless power transfer system of claim 6, wherein the ferrite core is made of a flexible ferrite material.

10. The wireless power transfer system of claim 6, wherein the wireless power receiver is coupled to a portable electronic device.

11. An electronic device comprising:
a wireless power receiver structure comprising
a ferrite core, wherein a cross section of the ferrite core is solid,
a receiver coil having a length wrapped around the ferrite core such that the ferrite core and the receiver coil share a longitudinal axis, wherein the receiver coil is disposed at a same angle to the longitudinal axis along the length of the receiver coil, and
a receive circuit coupled to the receiver coil configured to convert a time varying current induced in the receiver coil into a voltage; and
a visible marking disposed on an external portion of a housing of the wireless power receiver structure, the visible marking representative of a direction of the longitudinal axis with respect to the housing.

12. The electronic device of claim 11, wherein the ferrite core is a cylindrical rod and the receiver coil is a helical coil.

13. The electronic device of claim 11, wherein the ferrite core is a parallelepiped.

14. The electronic device of claim 11, wherein the ferrite core is made from a flexible ferrite material.

15. The electronic device of claim 11, further comprising a strap and wherein the wireless power receiver structure is embedded in the strap.

16. The electronic device of claim 11, further comprising a strap and wherein the ferrite core and the receiver coil are embedded in the strap.

17. The electronic device of claim 11, further comprising a temple piece and wherein the ferrite core and the receiver coil are embedded in the temple piece.

18. The electronic device of claim 11, further comprising a rechargeable battery coupled to the wireless power receiver structure.

19. The wireless power transfer system of claim 1, wherein the visible marking is disposed on the external portion of the housing.

20. The wireless power transfer system of claim 1, wherein the longitudinal axis of the receiver coil is parallel with a first side of the housing.

21. The wireless power transfer system of claim 20, wherein the first side of the housing comprises an external communication port.

22. The wireless power transfer system of claim 13, wherein the visible marking is disposed on the external portion of the housing.

23. The wireless power transfer system of claim 6, wherein the longitudinal axis of the receiver coil is parallel with a longitudinal axis of a side of the housing.

24. The wireless power transfer system of claim 23, wherein the side of the housing comprises an external communication port.

25. The electronic device of claim 11, wherein the longitudinal axis of the receiver coil is parallel with a longitudinal axis of a side of the housing.

26. The electronic device of claim 25, wherein the side of the housing comprises an external communication port.

* * * * *